United States Patent [19]
Ishida

[11] Patent Number: 6,081,725
[45] Date of Patent: Jun. 27, 2000

[54] PORTABLE TELEPHONE SYSTEM AND CONTROL METHOD THEREFOR

[75] Inventor: Takeshi Ishida, Kodama-gun, Japan

[73] Assignee: NEC Corporation, Tokyo, Japan

[21] Appl. No.: 08/957,826

[22] Filed: Oct. 27, 1997

[30] Foreign Application Priority Data

Oct. 30, 1996 [JP] Japan .................................. 8-288290

[51] Int. Cl.[7] .................................................. H04Q 7/32
[52] U.S. Cl. ...................... 455/462; 455/421; 455/456
[58] Field of Search ................................. 455/421, 456, 455/457, 528, 461, 566, 462, 567; 329/164

[56] References Cited

U.S. PATENT DOCUMENTS

| | | | |
|---|---|---|---|
| 5,203,013 | 4/1993 | Breeden et al. | 455/434 |
| 5,218,628 | 6/1993 | Ito | 455/462 |
| 5,233,641 | 8/1993 | Maeda | 455/567 |
| 5,379,339 | 1/1995 | Sakamoto | 455/461 |
| 5,517,551 | 5/1996 | Arai | 455/566 |
| 5,592,534 | 1/1997 | Ito | 455/435 |
| 5,627,875 | 5/1997 | Kapsales | 455/434 |
| 5,832,386 | 11/1998 | Nojima et al. | 455/465 |
| 5,905,956 | 5/1999 | Young et al. | 455/450 |

FOREIGN PATENT DOCUMENTS

| | | |
|---|---|---|
| 0017898 A1 | 10/1980 | European Pat. Off. . |
| 0383630 A1 | 8/1990 | European Pat. Off. . |
| 4-337951 | 11/1992 | Japan . |
| 2 295 944 | 6/1996 | United Kingdom . |
| 2295944 | 12/1996 | United Kingdom ............. H04Q 7/38 |
| WO 92/04782 | 3/1992 | WIPO . |

*Primary Examiner*—William G. Trost
*Assistant Examiner*—Sonny Trinh
*Attorney, Agent, or Firm*—Scully, Scott, Murphy & Presser

[57] ABSTRACT

The invention has the object of notifying a caller terminal when it is not possible to connect with a call destination terminal in a portable telephone system, in order to avoid further calls to the call destination terminal while it is still not possible to achieve a connection with the call destination terminal. With the invention, it is possible to confirm whether or not the call destination terminal is capable of connecting, continually monitor the status of the call destination terminal, and to be informed immediately when it becomes possible to achieve a connection due to the activation of a ringer. Additionally, even if the ringer which gives notification that connection is possible is activated while the caller is away from the caller terminal, the caller is able to be notified that connection is possible later by looking at a display on the caller terminal.

8 Claims, 7 Drawing Sheets

PORTABLE TELEPHONE SYSTEM AND CONTROL METHOD THEREFOR

BACKGROUND OF THE INVENTION

1. Field of the Invention

The present invention relates to portable telephone systems and methods for controlling such systems, particularly to telephone systems provided with the capability of periodically notifying a caller terminal of the status of the call destination terminal when the call destination terminal is busy or outside communication range until connection is made possible, and to methods for controlling such portable telephone systems. This application is based on Patent Application No. Hei 8-288290 filed in Japan, the content of which is incorporated herein by reference.

2. Background Art

Recently, portable telephone systems have been introduced as one type of telephone network. These portable telephone systems often employ a cellular format wherein a base station is provided every few kilometers and there are multiple service areas.

According to a conventional technique described in Japanese Patent Application, First Publication No. Hei 4-337951, when a call destination terminal is busy or is outside communication range, a function known as a "camp-on" function is often used, wherein a camp-on registration operation is performed at the caller terminal and the call is automatically returned to the registrant for connection to the call destination terminal when the call destination terminal becomes free or enters communication range. That is, this portable telephone system comprises a plurality of stationary telephones, a plurality of mobile terminals, a wireless control circuit, a wireless base station, and a switchboard having a CPU, a main memory device, a communication circuit, a wireless control circuit and a trunk control circuit. In this system, the switchboard periodically issues a command in order to check whether or not a specified mobile terminal is within range. If there is a response from the specified mobile terminal, the switchboard judges the specified mobile terminal to be within range and finds it to be within range by means of position registration. If a call is sent from another mobile terminal to the specified mobile terminal while the specified mobile terminal is out of range, the other mobile terminal is notified that the specified terminal is out of range by means of a busy tone or a character display, and an out-of-range camp-on registration operation is performed at the other mobile terminal (by dialing or pressing a one-touch function button). The CPU performs an out-of-range camp-on registration and notifies the other mobile terminal of the registration (by a tone or the like). Meanwhile, the CPU periodically ascertains whether or not the specified mobile terminal is within range, and when an in-range notification is received from the specified mobile terminal, the signal is sent to the camp-on registered other mobile terminal, at which point the camp-on registration state is automatically canceled. Thus, since this portable telephone system is capable of automatically discerning from the state of actual absence by means of movement of the terminals, the catch signal in the event of absence is made the same as a busy signal so as to allow the caller terminal to automatically confirm that the call destination terminal is absent, and by making a camp-on registration at this time, the call is returned to the caller terminal when the call destination terminal enters the communication range, thereby preventing errors wherein a call is returned even in the absence of the call destination terminal. Consequently, improved service can be expected with respect to the caller terminal.

However, this system has the drawback that the call is returned only once to the registrant who is the caller under the camp-on function, and if the registrant is away from the portable telephone or cannot answer the telephone when the call is returned, the camp-on function will be canceled after a standard period of time unless the phone is taken off the hook. Thus, if the registrant has not heard the return call, he may remain unaware that the camp-on function has been canceled.

According to another conventional system described in Japanese Patent Application, First Publication No. Sho 64-44659, when the call destination terminal is busy, the number of the caller terminal is stored on the call destination terminal side, so as to allow the called party to return the call to the stored caller number after the terminal has become free. That is, this system employs a telephone equipped with a one-touch call-back function for storing a caller telephone number which is sent from the switchboard when a signal arrives at the call destination terminal, so as to allow the call to be returned later by retrieving the number from memory in a one-touch operation. The system comprises a line control device for sending and receiving signals between a switchboard and telephones, a memory device for storing the caller number sent from the switchboard via the line control device, an operating device for providing instructions to retrieve and call the caller number, a display device for displaying the caller number, and a control device for retrieving a caller number stored in the memory means and calling the specified caller number based on the instructions from the operating device. Consequently, a list of multiple received calls is able to be prepared inside the telephone, and these can be freely retrieved for one-touch call-backs.

This system has the drawback that the call-back function cannot be used when the mobile terminal on the call destination side is out of range. This is because when the call destination terminal is out of range, it is not possible to achieve a connection, so that the telephone number of the caller terminal cannot be stored in the call destination terminal. Additionally, under this call-back function, the caller must simply wait for the called party to finish communicating with the third party and to return the call to the caller terminal. Therefore, even if the caller urgently wishes to contact the called party, the return call will be delayed if the called party decides to postpone the return call.

SUMMARY OF THE INVENTION

The present invention has the object of improving portable telephone systems by employing a function wherein the base station notifies a caller terminal of the state of a call destination terminal when the call destination terminal is busy or outside communication range, and the base station continues to periodically monitor the status (such as being busy, out of range, or in range) of the call destination terminal and notify the caller terminal of this data until the caller terminal achieves a connection with the call destination terminal. The status of the call destination terminal is displayed on a display section of the caller terminal, thus allowing the status of the call destination terminal to be known.

Additionally, when a connection between the caller terminal and the call destination terminal becomes possible, the caller terminal detects that a connection is possible from the state of the call destination terminal notified by the base station, and gives an active signal that connection is possible by sounding a ringer or the like.

In order to achieve the above-mentioned object, the present invention offers a portable telephone system comprising a base station having subscriber number storage means for storing a subscriber number A of a caller terminal and a subscriber number B of a call destination terminal; status detection means for detecting a status of the call destination terminal based on the subscriber number B stored in the subscriber number storage means, the status including states of being busy, out of communication range and capable of connecting; status notification means for notifying the caller terminal of the status of the call destination terminal found by the status detection means based on the subscriber number A stored in the subscriber number storage means; and status notification registration means for registering a status detected by the status detection means; and a portable telephone having status display means for displaying a status of the call destination terminal found by the status notification means; connectability detection means for detecting information indicating that a connection is possible from among information obtained from the status notification means; and reporting means for reporting to a caller when the connectability detection means finds that a connection is possible.

The present invention also offers a method of controlling a portable telephone system, comprising steps of storing a subscriber number A of a caller terminal and a subscriber number B of a call destination terminal in subscriber number storage means; detecting the status of the call destination terminal by status detection means based on the subscriber number B stored in the subscriber number storage means, the status including states of being busy, out of communication range and capable of connecting; notifying the caller terminal by status notification means of the status of the call destination terminal detected by the status detection means based on the subscriber number A stored in the subscriber number storage means; and registering the status detected by the status detection means by status notification registration means; displaying the status of the call destination terminal obtained by the status notification means on display means provided in a portable telephone connected to the base station; detecting information indicating that a connection is possible from among information obtained by the status notification means by connectability detection means; and reporting to a caller when the connectability detection means finds that connection is possible by report means.

According to the present invention, the status (busy, out of range, in range) of the call destination terminal is continually displayed on the display portion of the caller terminal when a call destination terminal status notification registration is made, so that when it is initially not possible to connect with the call destination terminal, it is possible to monitor the subsequent status of the call destination terminal.

Additionally, when the caller terminal and call destination terminal are able to connect, the ringer of the caller terminal is activated to notify the caller, as a result of which the caller can be immediately notified that it is possible to achieve a connection between the caller terminal and the call destination terminal.

Furthermore, after the ringer has been activated for a standard period of time, the ringer automatically shuts off. However, since the display portion continues to display an in-range message, the caller is notified that a connection is possible even if the ringer is activated while the caller is away from the caller terminal.

Additionally, even if a notification that connection is possible has already been made once, the display portion continues to display the status of the call destination terminal every standard period of time unless a connection is achieved between the caller terminal and the call destination terminal within a specified time. Consequently, if the caller is not able to immediately respond when notified that a connection is possible, the caller is able to be notified when he is ready to respond if a connection is once again not able to be achieved with the call destination terminal, thus preventing cases of ineffectual calling.

DESCRIPTION OF PREFERRED
EMBODIMENTS OF THE INVENTION

First Embodiment

Figure 1:
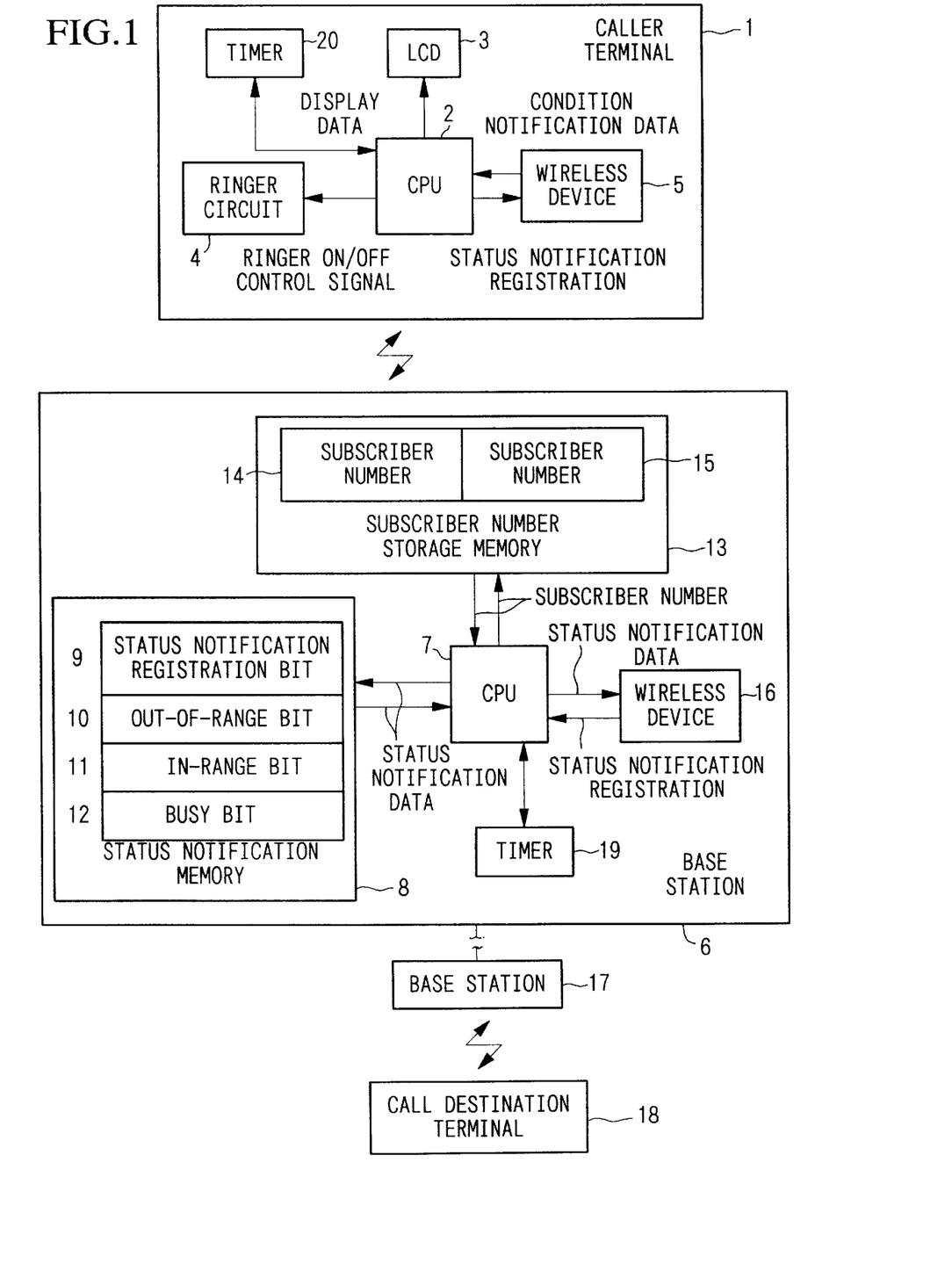
FIG. 1 is a diagram showing a first embodiment according to the present invention.
Figure 2:
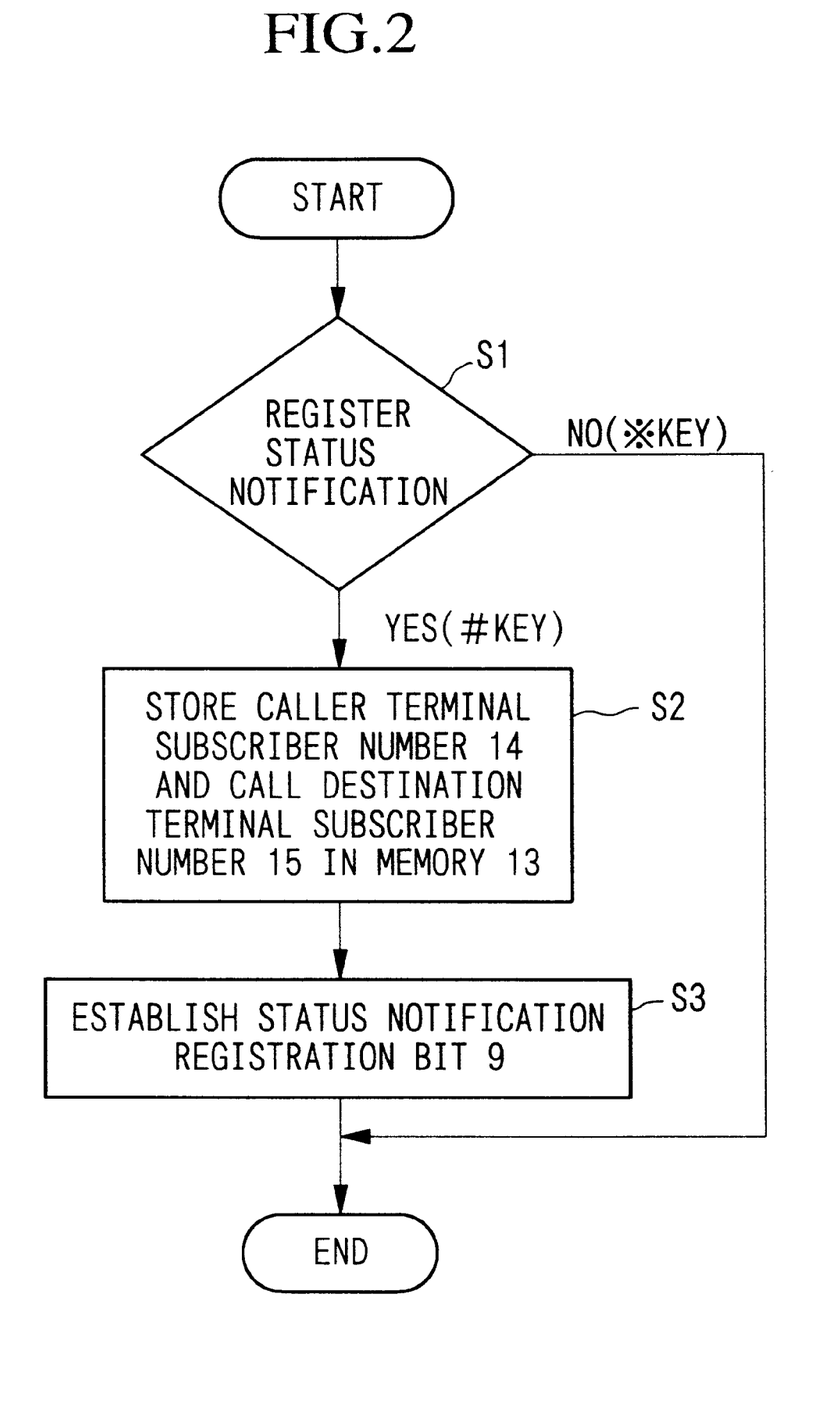
FIG. 2 is a flow chart for a call destination terminal status registration function of the CPU 7 according to the present invention.
Figure 3:
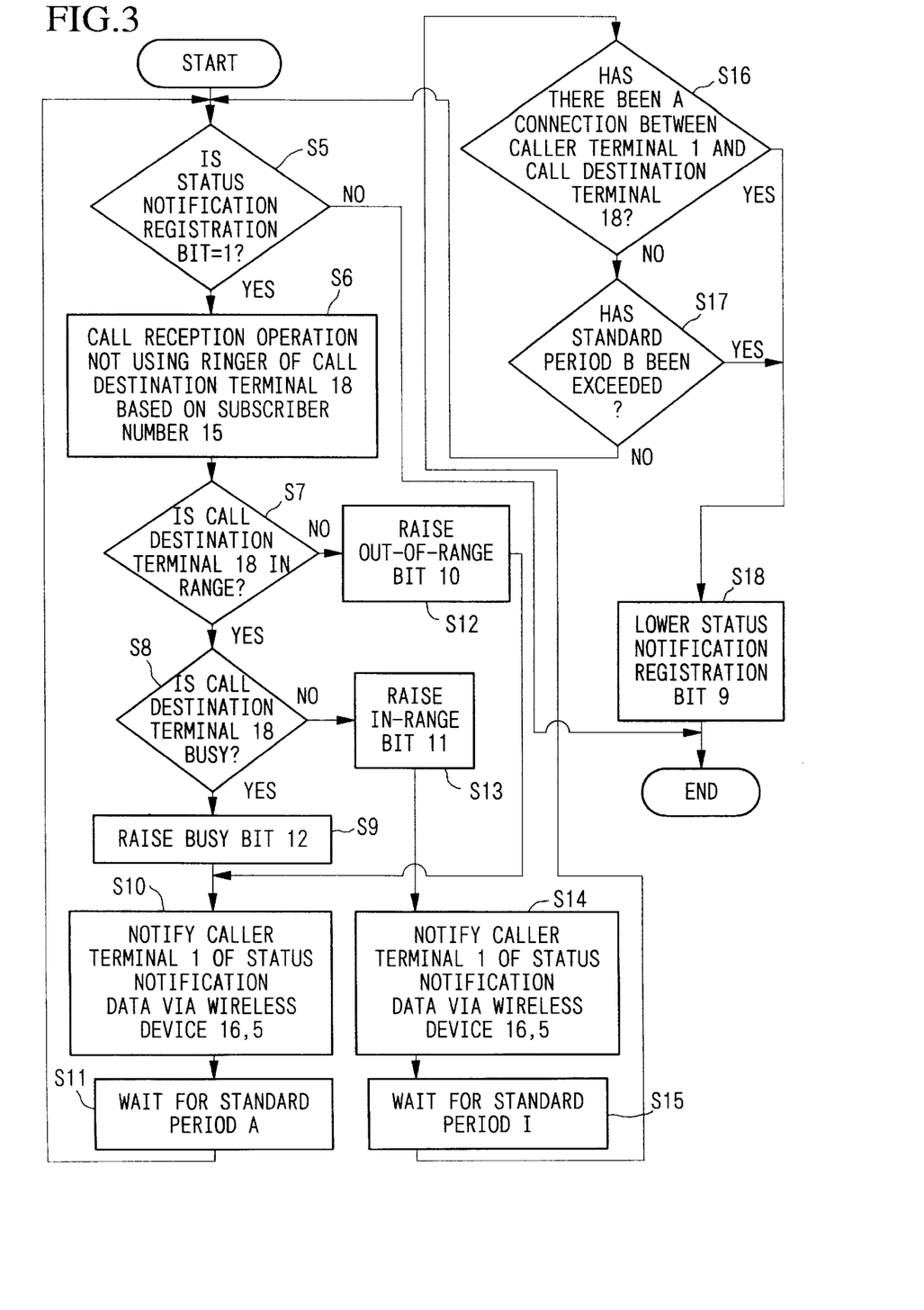
FIG. 3 is a flow chart for a call destination terminal status detection and notification functions of the CPU 7 according to the present invention.

An embodiment of the present invention shall be explained in detail with reference to the drawings. FIG. 1 is a drawing showing the structure of an embodiment of the present invention. In FIG. 1, the mobile communication system is composed of a caller terminal 1, a call destination terminal 18, a base station 6 and a base station 17. FIG. 2 is a flow chart for the function whereby the base stations 6 and 17 notify the caller terminal 1 of the status of the call destination terminal 18. FIG. 3 is a flow chart for the function whereby the base stations 6 and 17 detect the status of the call destination terminal 18 and notify the caller terminal 1 of the status.

Referring to FIG. 1, the base station 6 of the present embodiment is composed of a CPU 7, a call destination terminal status notification memory 8, a subscriber number storage memory 13, and a wireless device 16. The call destination terminal status notification memory 8 has a call destination terminal status notification registration bit 9, an out-of-range bit 10, an in-range bit 11 and a busy bit 12. The subscriber number storage memory 13 stores the subscriber number 14 of the caller terminal 1 and the subscriber number 15 of the call destination terminal 18. The CPU 7 has the capability of detection and giving notification of the status of the call destination terminal 18 (FIG. 3) and has a status notification registration capability of registering this work (FIG. 2). The base station 17 has the same structure and capabilities as the base station 6, and operates in the same manner as the base station 6 when the call destination terminal 18 becomes a caller terminal.

Figure 4:
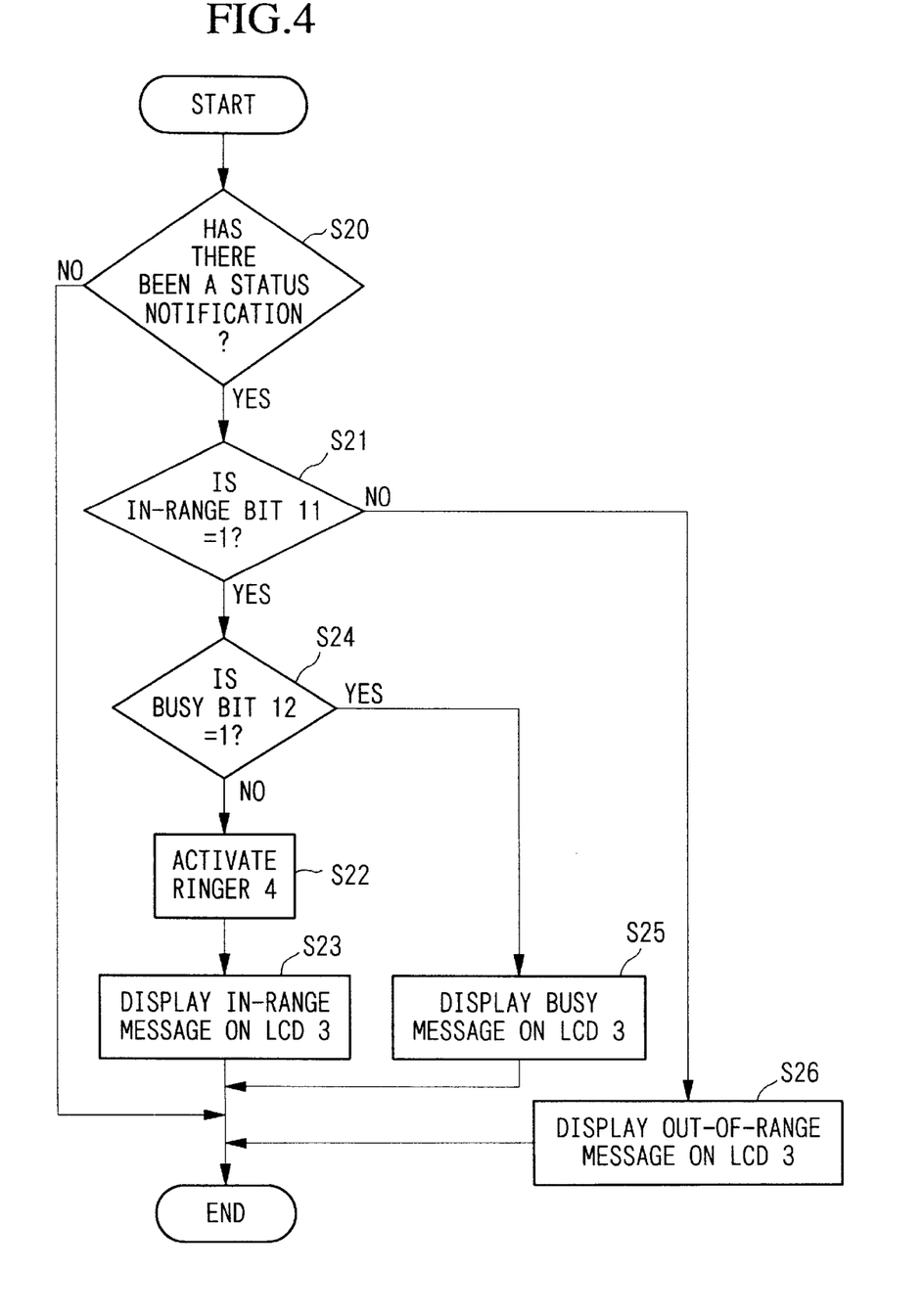
FIG. 4 is a flow chart for a connectable state detection function of the CPU 2 according to the present invention.

Additionally, the caller terminal 1 is composed of a CPU 2, an LCD 3, a ringer circuit 4 and a wireless device 5. The CPU 2 has the capability of detecting whether a connection with the caller terminal 18 is possible (FIG. 4). The call destination terminal 18 has the same structure and capabilities as the caller terminal 1, and operates in the same manner as caller terminal 1 when the call destination terminal becomes a caller terminal.

The status notification registration function for registering the status of the call destination terminal 18 shall be explained with reference to the flow chart shown in FIG. 2. When the caller terminal 1 is unable to connect with the call destination terminal 18, the status of the call destination terminal 18 is registered in the memory of the base station 6. First, when the caller terminal 1 is notified by the base station 6 that a connection is not possible, an operator of the caller terminal requests the base station 6 for registration by, for example, pressing the "#" key (S1). When the "#" is pressed, the base station 6 stores the subscriber number 14 of the caller terminal and the subscriber number 15 of the call destination terminal in the subscriber number storage memory 13 (S2), then stores a "1" as a flag in the status notification registration bit 9 (S3).

FIG. 3 is a flow chart showing the procedure whereby the base station 6 detects and gives notification of the status of the call destination terminal. First, the CPU 7 of the base station 6 determines whether or not there is a "1" in the status notification registration bit 9 of the status notification memory 8 (S5). If there is a "1" (YES), then a call reception operation wherein the ringer is not rung is performed on the call destination terminal 18 based on the subscriber number 15 of the all destination terminal 18 (S6). Next, the base station 6 determines whether or not the call destination terminal 18 is within communication range (S7). In this case, the call destination terminal 18 is determined to be within range if the base station 17 has registered the position of the call destination terminal 18. The determination of whether or not the call destination terminal 18 is within range is made based on whether or not there is a "1" in the in-range bit 11 of the status notification memory 8. If the call destination terminal 18 within communication range, then it is determined whether or not the call destination terminal is busy (S8). On the other hand, if the call destination terminal 18 is determined to be out of communication range in step S7, then a "1" is placed in the out-of-range bit 10 of the status notification memory 8 (S12). Additionally, if the call destination terminal 18 is determined to be busy in step S8, then a "1" is placed in the busy bit 12 of the status notification memory 8 (S9). The determination of whether or not the call destination terminal is busy is made by making an inquiry to the base station on the call destination terminal side.

Next, the base station 6 notifies the CPU 2 of the caller terminal 1 via the wireless device 16 and the wireless device 5 of the data indicating that the call destination terminal is out of range or busy stored in the status notification memory 8 (S10). Next, the base station 6 waits for a standard period of time A in accordance with a timer 19 (S11). If the call destination terminal 18 is determined not to be busy in step S8, the base station 6 places a "1" in the in-range bit 11 of the status notification memory 8 (S13). Subsequently, the base station 6 notifies the CPU 2 of the caller terminal 1 via the wireless device 16 and the wireless device 5 of the data indicating that the call destination terminal is in communication range stored in the status notification memory 8 (S15). Then, after waiting for a standard period of time A (S15), the base station 6 determines whether or not communication has been achieved between the caller terminal 1 and the call destination terminal 18 by determining whether or not the caller terminal 1 has made a call (S16). If the caller terminal 1 has not made a call, it is determined whether or not a standard period of time B has been exceeded (S17). Additionally, if the caller terminal 1 has made a call within the standard period of time B in step S17, then the "1" in the status notification registration bit 9 of the status notification memory 8 is changed to "0" (S18) and all of the bits in the status notification memory 8 are made invalid. Additionally, after step S11, the procedure is advanced to step S5 if the standard period of time B in step S17 has been exceeded.

FIG. 4 is a flow chart showing the function whereby the CPU 2 of the caller terminal 1 detects whether connection is possible. An operator 1 notifies the base station 6 of the call destination terminal 18 by taking the caller terminal 1 off the hook and keying in the dial number of the call destination terminal 18. Subsequently, the CPU 2 of the caller terminal determines whether or not a status notification has been received from the base station 6 (S20), and terminates the procedure if there has been no status notification. If there has been a status notification, it is determined whether or not there is a "1" in the in-range bit 11 which indicates that the call destination terminal 18 of which the status has been notified is within communication range (S21). If there is a "1" in the in-range bit 11, then the ringer circuit 4 activates the ringer (S22). Next, the CPU 2 displays on the LCD 3 that the call destination terminal 18 is within communication range, then terminates the procedure (S23). On the other hand, if there is no "1" in the in-range bit 11 in step S21, then it is determined whether or not there is a "1" in the busy bit 12 (S24) If there is a "1" in the busy bit 12, then the CPU 2 displays on the LCD 3 that the call destination terminal 18 is busy, then terminates the procedure (S25). If there is no "1" in the busy bit 12 in step S24, then the CPU 2 displays on the LCD 3 that the call destination terminal 18 is out of range, then terminates the procedure (S26).

Figure 5:
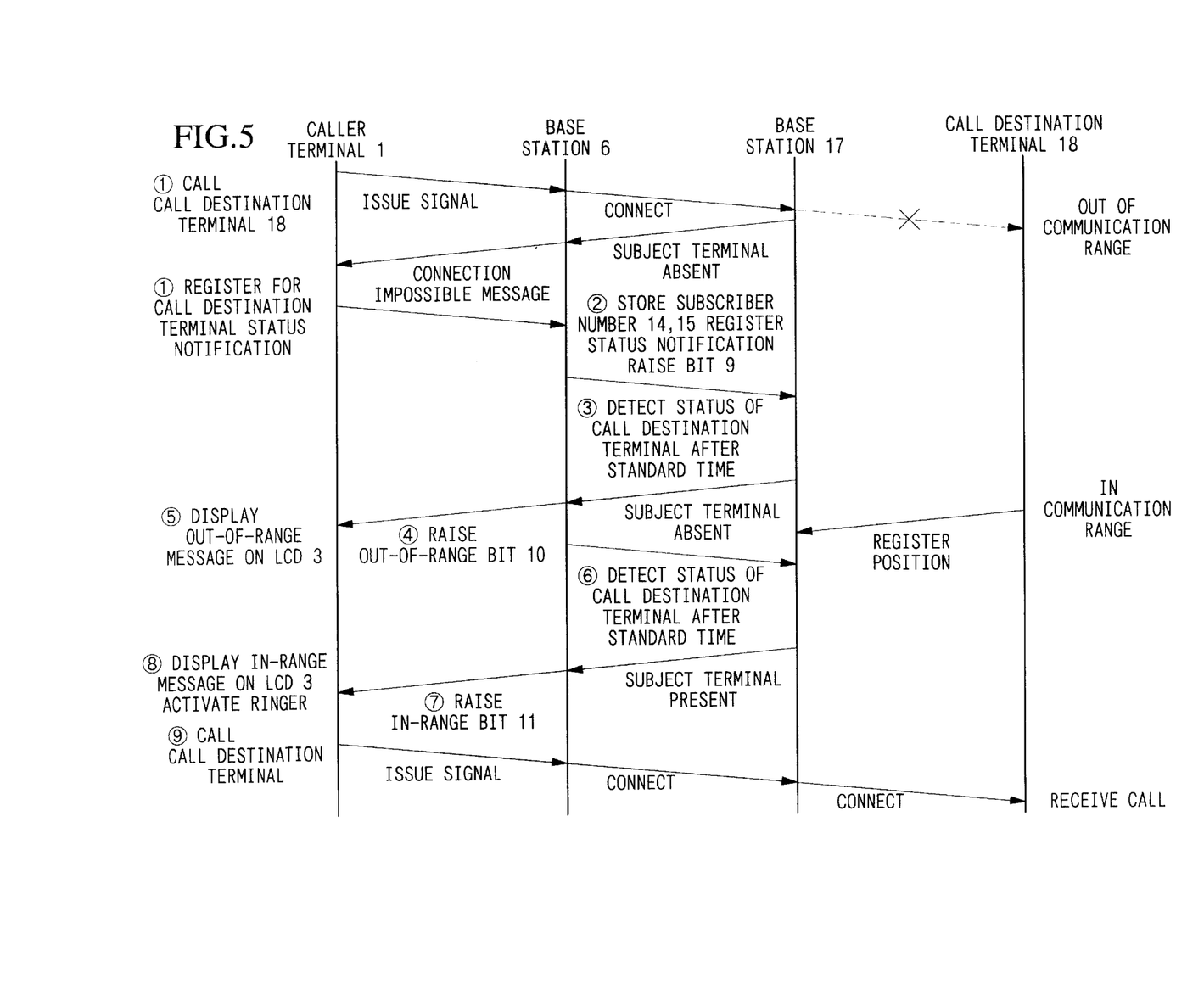
FIG. 5 is an operational flow chart I for a call destination terminal status notification function according to the present invention.

Next, the operations of an embodiment of the present invention shall be explained in further detail. FIG. 5 indicates the procedures in the caller terminal 1, base station 6, base station 17 and the call destination terminal 18.

(1) First, the base station 6 is notified that the caller is off the hook, and when the dial number of the call destination terminal is inputted to make a telephone call in response to the reply from the base station 6, if communication is not possible due to the call destination terminal 18 being out of communication range, the base station 17 notifies base station 6 that the relevant terminal is not present. In accordance with the flow chart (FIG. 2) relating to the means by which the CPU 7 in the base station 6 registers the notification of the status, a message indicating that connection is not possible is sent to the caller terminal, and status notification registration is performed by pressing the "#" key at the caller terminal 1.

(2) The CPU 7 which has received the status notification registration instruction stores the subscriber number 14 of the caller terminal and the subscriber number 15 of the call destination terminal as a pair in the subscriber number storage memory 13, and stores the status notification registration bit 9 in the status notification memory 8.

(3) After the passage of a standard period of time due to the count of the timer 19 from the storage of the status notification registration bit 8 in the status notification memory 8, the CPU 7 of the base station 6 performs a status detection in accordance with the flow chart (FIG. 3) relating to the status detecting and notifying means of the call destination terminal 18.

(4) Here, the base station performs a call reception operation without activating the ringer of the call destination terminal, and notifies the caller terminal 1 by raising the out-of-range bit 10 of the CPU 7 if the terminal does not exist.

(5) The caller terminal 1 which has received the information that the call destination terminal 18 displays that the call destination terminal 18 is out of range on the LCD 3.

(6) After the passage of another standard period of time, the CPU 7 again detects the status of the call destination terminal 18.

(7) If the status detection after the standard period of time indicates that the call destination terminal 18 has entered communication range, then the CPU 7 notifies the caller terminal 1 by raising the in-range bit 11.

(8) The caller terminal 1 which has received the information that the call destination terminal has entered communication range displays on the LCD 3 that the call destination terminal is within range, and causes the ringer circuit 4 to activate the ringer.

(9) Pressing a one-touch button on the caller terminal allows a connection to be made with the call destination terminal 18 via the base station 6 and base station 17.

Second Embodiment

Figure 6:
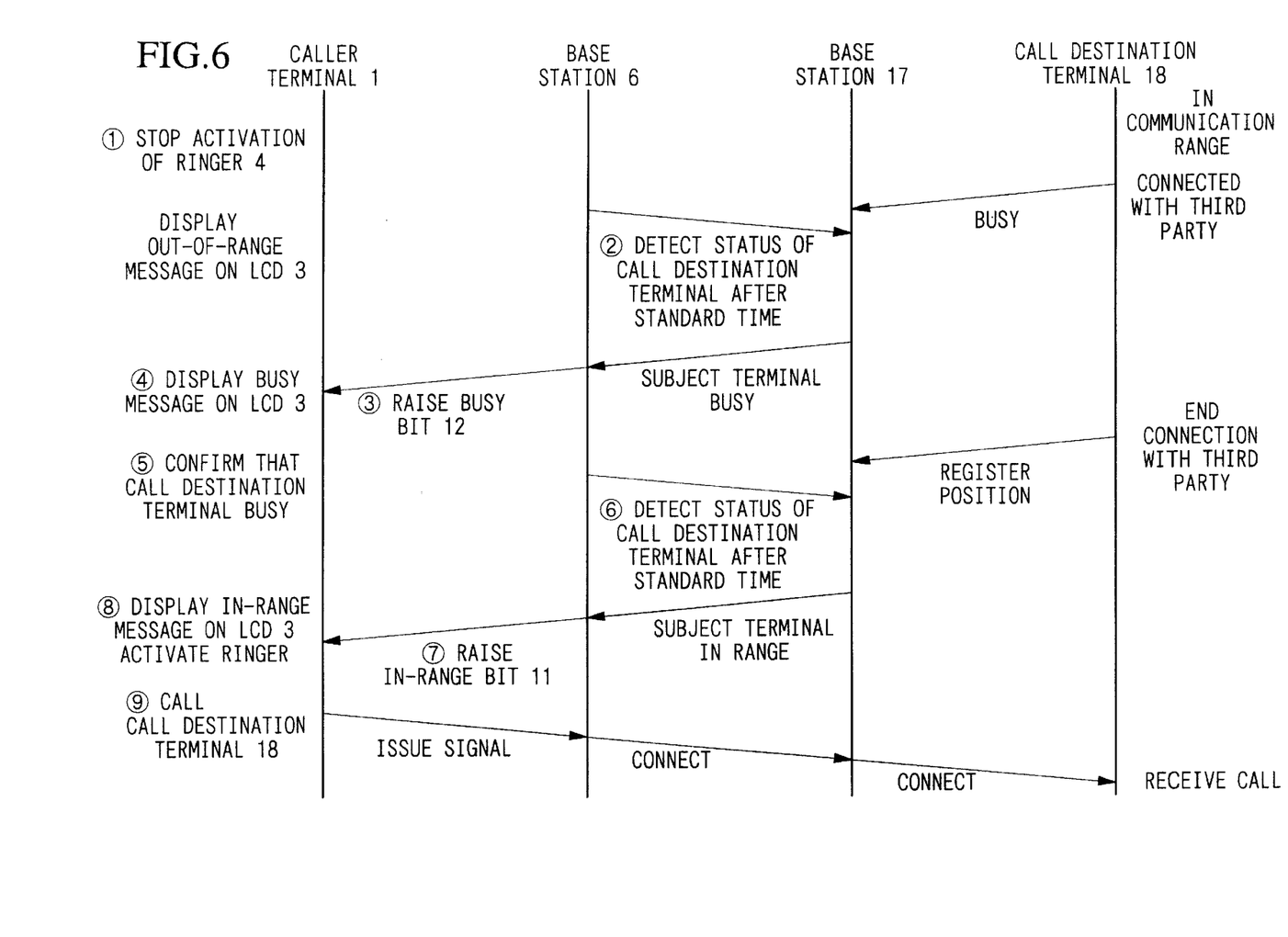
FIG. 6 is an operational flow chart II for a call destination terminal status notification function according to the present invention.

Next, the operations of the present invention shall be explained by means of a second embodiment with reference to FIG. 6, in the same manner as the First Embodiment was explained with reference to FIG. 5. The present embodiment demonstrates a case wherein a status notification registration of the call destination terminal 18 is performed at the caller terminal 1, but the caller is away from the caller terminal 1 when the caller terminal 1 is notified by the base station 6 that the call destination terminal 18 is within communication range and the ringer of the caller terminal 1 is activated.

(1) The caller terminal 1 waits for a standard period of time according to the timer 20, then, stops activating the ringer by means of the ringer circuit 4 after the standard period of time has passed, then continuously displays on the LCD 3 that the call destination terminal is within range.

(2) The base station 6 performs a call destination status detection every standard period of time until a connection is achieved between the caller terminal 1 and the call destination terminal 18.

(3) If the call destination terminal 18 becomes busy with a third party, then the CPU 7 notifies the status notification means of the caller terminal 1 by raising the busy bit 12 of the CPU 7.

(4) The caller terminal 1 which has received a notification that the call destination terminal 18 is busy then displays the busy status on the LCD 3 under control of the CPU 2.

(5) At this time, if the caller returns to the caller terminal 1, then the caller is able to see that the call destination terminal 18 is busy by looking at the display of the LCD 3.

(6) After the passage of a standard period of time, the CPU performs a call destination terminal status detection.

(7) If the call destination terminal 18 has become free, then the CPU 7 notifies the caller terminal 1 of the status by raising the in-range bit 11.

(8) The caller terminal 1 which has received the information that the call destination terminal 18 is within communication range displays that the in-range status on the LCD 3 and again activates the ringer.

(9) By pressing a on-touch button on the caller terminal 1, it then becomes possible to connect to the call destination terminal via the base station 6 and the base station 17.

In the first and second embodiments, cases wherein there are two base stations 6 and 17 have been described. However, in actuality, the caller terminal is connected to the call destination terminal via one or more base stations, and the subscriber numbers of the caller terminal 1 and call destination terminal 18 are stored, and the status of the call destination terminal 18 is stored in the status notification memory, in the base station closest to the caller terminal 18. As a result, it becomes convenient for notifying the caller terminal when the caller terminal makes another call. In a different base station is used, it becomes necessary to operate another base station in order to notify the caller terminal, and is therefore not very practical. On the other hand, when a call-back to the call destination terminal is to be performed, the base station closest to the call destination terminal may be provided with a status notification memory for storing the pair of subscriber number and storing the status of the call destination terminal and the caller terminal.

Additionally, while the caller terminals were primarily considered to be portable telephones in the first and second embodiments, they may be normal line telephones. However, while the call destination terminals must be portable telephones, they may also be beepers or pagers if means other than the base stations 17 are provided for registering the positions of the call destination terminals.

Third Embodiment

In the present embodiment, the call destination terminal is not switched on, in which case the call destination terminal is outside of communication range. Additionally, there is a single base station.

When a call is made from the portable telephone of the caller terminal 1 to the portable telephone of the call destination terminal 18, and the call destination terminal 18 is not within range of electromagnetic communication or the call destination terminal 18 is turned off, then the subscriber number of the caller terminal 1 and the subscriber number of the call destination terminal are stored in the base station.

When the call destination terminal 18 has entered communication range or the call destination terminal 18 has been turned on, the base station detects that the call destination terminal 18 identified by the data stored in the base station has entered communication due to the registration of the position of the call destination terminal 18.

Next, the base station 6 sends data indicating that the call destination terminal 18 has entered communication range for the call destination terminal 18 having the subscriber number corresponding to the subscriber number of the caller which has been stored. The caller terminal 6 which has received this data activates a tone or displays a message in order to notify the caller that it is possible to connect to the other party.

Figure 7:
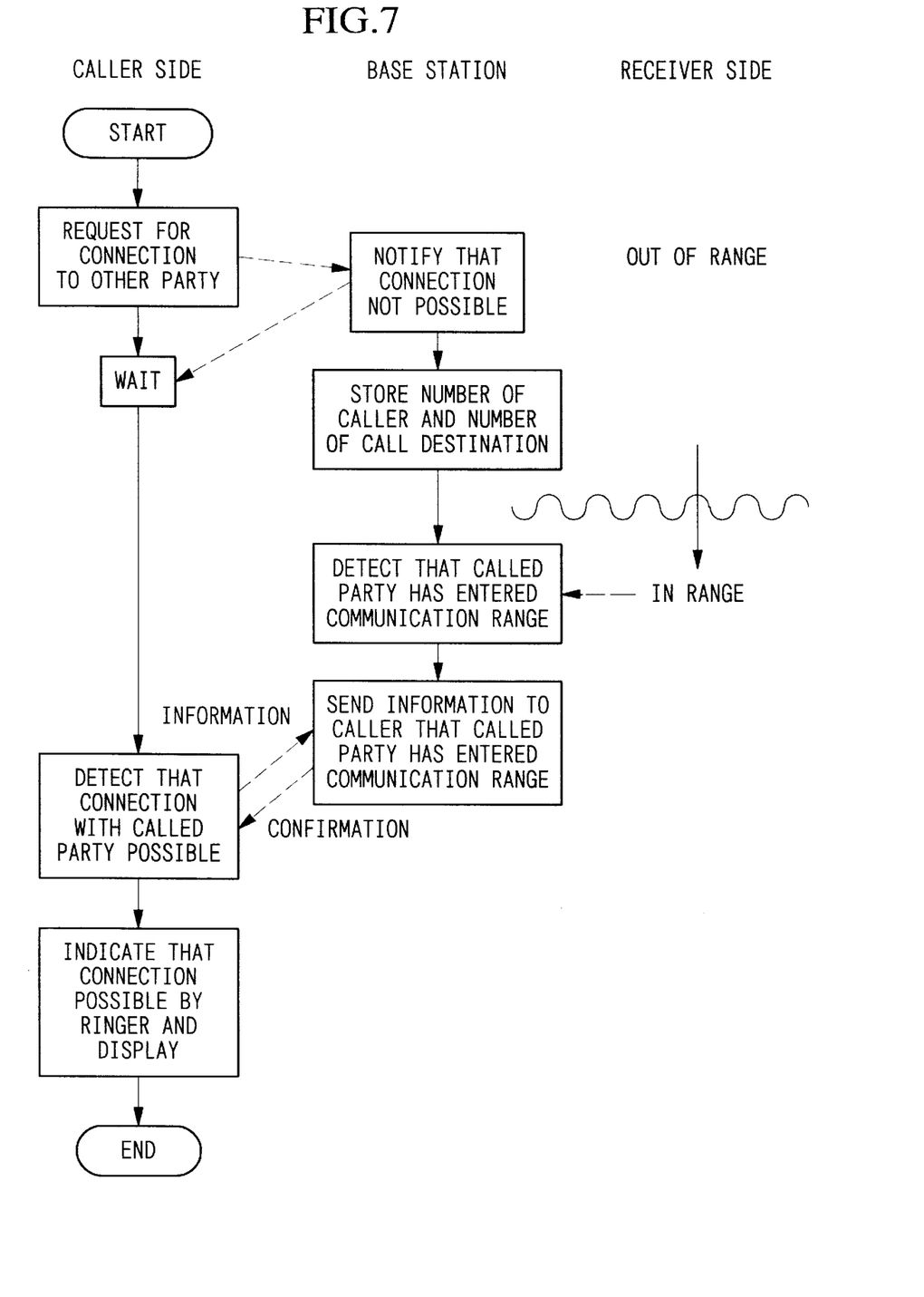
FIG. 7 is a flow chart for a call destination status notification registration function of an embodiment according to the present invention.

As shown in FIG. 7, when a call is made from the portable telephone of the caller terminal 1 to the portable telephone of the call destination terminal 18 of the other party, and the call destination terminal 18 is outside the range of electromagnetic communication or the call destination terminal 18 is not turned on, then the base station notifies the caller that it is not possible to connect to the call destination terminal 18, and stores the subscriber number of the caller and the subscriber number of the call destination terminal 18 to which it was intended to connect. Then, the base station searches all of the subscriber numbers of portable telephones of which the positions have been newly registered, comparing them with the subscriber number of the call destination terminal 18 which has been stored, and repeats this until a match is found.

When the call destination terminal 18 has entered communication range or been switched on, the base station detects that the call destination terminal 18 of which the number was stored has entered the range of use, by means of the position registration of the call destination terminal 18.

Next, the base station sends data indicating that the call destination terminal 18 has entered communication range to the caller terminal 1 having the subscriber number which has been stored. The caller terminal 1 which has received this data activates a tone or displays a message in order to notify the caller that it is possible to connect to the other party at the call destination terminal 18.

At this time, the telephone number of the call destination terminal 18 is displayed in order to notify the caller of the person with which he is able to connect.

Due to the above, the caller is enabled to connect with the person on the call destination end as quickly as possible.

What is claimed is:

1. A portable telephone system comprising:
    a caller terminal;
    at least one base station; and
    a call destination terminal which is sortable, a base station associated with said caller terminal being provided with:
        status detection means for detecting a status of said call destination terminal, the status including stages of being busy, out of communication range and capable of connecting; and
        status notification means for notifying said caller terminal of the status of said call destination terminal found by said status detecting means,
    wherein said status notification means determines whether or not said call destination terminal is busy by sending an inquiry to a base station associated with said call destination terminal, determines whether or not said call destination terminal is outside communication range by determining whether or not a position of said call destination terminal is registered in a base station associated with said call destination terminal, and determines whether or not said call destination terminal is free for connection by determining if said call destination terminal is within communication range and is not busy.

2. A portable telephone system comprising:
    a base station having
        subscriber number storage means for storing a subscriber number A of a caller terminal and a subscriber number B of a call destination terminal;
        status detection means for detecting a status of said call destination terminal based on the subscriber number B stored in said subscriber number storage means, the status including states of being busy, out of communication range and capable of connecting;
        status notification means for notifying said caller terminal of the status of said call destination terminal found by said status detection means based on the subscriber number A stored in said subscriber number storage means; and
        status notification registration means for registering a status detected by said status detection means; and
    a portable telephone having
        status display means for displaying a status of said call destination terminal found by said status notification means;
        connectability detection means for detecting information indicating that a connection is possible from among information obtained from said status notification means; and
        reporting means for reporting to a caller when said connectability detection means finds that a connection is possible; wherein
            when the caller is notified that said call destination terminal is busy or outside communication range, and registers for status notification at said status notification registration means with respect to said base station, said base station stores the subscriber number A of said caller terminal and the subscriber number B of said call destination terminal, periodically detects the status of said call destination terminal by said status detection means based on the subscriber number B, and notifies said caller terminal of the detected information by said status notification means, upon which said caller terminal displays the information obtained from said status notification means on said status display means and detects whether or not a connection is possible from the information obtained from said status notification means, such that if connection is possible, then the caller is reported that connection is possible by activating said report means for a standard period of time.

3. A portable telephone system in accordance with claim 2, wherein said reporting means is a ringer activation means.

4. A portable telephone system in accordance with claim 3, wherein when the caller is not available to hear the ringer which reports that connection is possible, said base station continues to periodically notify said caller terminal of the status of said call destination terminal until said caller terminal connects with said call destination terminal, and if a connection is not made within a predetermined period of time after connection becomes possible, the registration of the status notification of the call destination terminal is automatically canceled and the registration of the status notification of the call destination terminal can also be canceled from said caller terminal.

5. A method of controlling a portable telephone system, comprising steps of:
    storing a subscriber number A of a caller terminal and a subscriber number B of a call destination terminal in subscriber number storage means;
    detecting the status of the call destination terminal by status detection means based on the subscriber number B stored in the subscriber number storage means, the status including states of being busy, out of communication range and capable of connecting;
    notifying the caller terminal by status notification means of the status of the call destination terminal detected by the status detection means based on the subscriber number A stored in the subscriber number storage means; and
    registering the status detected by said status detection means by status notification registration means;
    displaying the status of the call destination terminal obtained by said status notification means on display means provided in a portable telephone connected to said base station;
    detecting information indicating that a connection is possible from among information obtained by the status notification means by connectability detection means; and
    reporting to a caller when the connectability detection means finds that connection is possible by report means.

6. A method of controlling a portable telephone system in accordance with claim 5, wherein said report means is a ringer activation means.

7. A method of controlling a portable telephone system in accordance with claim 6, wherein when the caller is notified that the call destination terminal is busy or outside communication range, and registers for status notification at the status notification registration means with respect to the base station, the method further comprises steps of:

- storing the subscriber number A of the caller terminal and the subscriber number B of the call destination terminal;
- periodically detecting the status of the call destination terminal by the status detection means based on the subscriber number B; and
- notifying the caller terminal of the detected information by the status notification means, upon which the caller terminal displays the information obtained from the status notification means on the status display means and detects whether or not a connection is possible from the information obtained from the status notification means, such that if connection is possible, then the caller is reported that connection is possible by activating the report means for a standard period of time.

8. A method of controlling a portable telephone system in accordance with claim 7, wherein when a state of being capable of connecting is detected, the method further comprises steps of:

- activating a ringer for a standard period of time by the ringer activation means, and
- displaying a message to the caller stating that it is possible to connect, by said display means.

* * * * *